(12) United States Patent
Shibazaki (10) Patent No.: US 10,288,955 B2
(45) Date of Patent: May 14, 2019

(54) LIQUID CRYSTAL DISPLAY DEVICE

(71) Applicants: INNOCOM TECHNOLOGY (SHENZHEN) CO., LTD., Shenzhen (CN); INNOLUX CORPORATION, Miao-Li County (TW)

(72) Inventor: Minoru Shibazaki, Miao-Li County (TW)

(73) Assignees: INNOCOM TECHNOLOGY (SHENZHEN) CO., LTD., Shenzhen, Guangdong Province (CN); INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/051,631

(22) Filed: Aug. 1, 2018

(65) Prior Publication Data
US 2018/0335674 A1   Nov. 22, 2018

Related U.S. Application Data

(63) Continuation of application No. 14/955,872, filed on Dec. 1, 2015, now Pat. No. 10,088,714, which is a
(Continued)

(51) Int. Cl.
*G02F 1/1333* (2006.01)
*G02F 1/1343* (2006.01)
(Continued)

(52) U.S. Cl.
CPC .... *G02F 1/134309* (2013.01); *G02F 1/13394* (2013.01); *G02F 1/133345* (2013.01);
(Continued)

(58) Field of Classification Search
CPC .......... G02F 1/134309; G02F 1/13394; G02F 1/134363; G02F 1/133345; G02F 1/133512; G02F 1/133514; G02F 2001/134372
(Continued)

(56) References Cited

U.S. PATENT DOCUMENTS

2007/0097303 A1   5/2007 Sonoda et al.
2007/0126969 A1   6/2007 Kimura et al.
(Continued)

FOREIGN PATENT DOCUMENTS

CN   101995705 A   3/2011
CN   102466934 A   5/2012
(Continued)

OTHER PUBLICATIONS

U.S. Appl. No. 14/955,872, filed Dec. 1, 2015.

*Primary Examiner* — Charles S Chang
(74) *Attorney, Agent, or Firm* — Birch, Stewart, Kolasch & Birch, LLP (57) ABSTRACT

A liquid crystal display device includes a substrate having pixel regions and a counter substrate opposed thereto. Gate lines and data lines intersect to define the pixel regions. A first common electrode overlaps the data lines and is disposed on a first insulating layer that is disposed on the substrate and the data lines. A second insulating layer is disposed between the first common electrode and a pixel electrode pattern that is disposed on the first insulating layer and insulated from the first common electrode. A second common electrode is disposed on one of the data lines and electrically connected to the first common electrode. A projection of the second common electrode on the substrate overlaps a projection of the one of the data lines on the
(Continued)

substrate. A spacer is disposed on the substrate and is overlapped with the one of the data lines.

20 Claims, 12 Drawing Sheets

Related U.S. Application Data continuation of application No. 13/558,782, filed on Jul. 26, 2012, now Pat. No. 9,239,501.

(51) Int. Cl.
    *G02F 1/1339*      (2006.01)
    *G02F 1/1335*      (2006.01)

(52) U.S. Cl.
    CPC .. *G02F 1/133512* (2013.01); *G02F 1/133514* (2013.01); *G02F 1/134363* (2013.01); *G02F 2001/134372* (2013.01)

(58) Field of Classification Search
    USPC .......................................................... 349/141
    See application file for complete search history.

(56) References Cited

U.S. PATENT DOCUMENTS

| | | |
|---|---|---|
| 2007/0171319 A1 | 7/2007 | Fujita et al. |
| 2009/0033848 A1 | 2/2009 | Oka et al. |
| 2009/0109356 A1 | 4/2009 | Kitagawa |
| 2010/0245733 A1* | 9/2010 | Ono ................... G02F 1/13394 349/106 |
| 2011/0156165 A1 | 6/2011 | Jang et al. |

FOREIGN PATENT DOCUMENTS

| | | |
|---|---|---|
| TW | 200521548 A | 7/2005 |
| TW | 200732803 A | 9/2007 |
| TW | 200951587 A | 12/2009 |

\* cited by examiner

LIQUID CRYSTAL DISPLAY DEVICE

CROSS REFERENCE TO RELATED APPLICATIONS

This application is a Continuation of pending U.S. patent application Ser. No. 14/955,872, filed Dec. 1, 2015 and entitled "LIQUID CRYSTAL DISPLAY DEVICE", which is a Continuation of U.S. patent application Ser. No. 13/558,782, filed Jul. 26, 2012 and entitled "LIQUID CRYSTAL DISPLAY DEVICE", the entirety of which is incorporated by reference herein.

BACKGROUND

Technical Field

The present invention relates to a liquid crystal display device, and in particular relates to a liquid crystal display device with a high pixel density.

Description of the Related Art

Liquid crystal displays have become increasingly used in various electronic devices. In particular, active matrix liquid crystal displays (AMLCD) have attracted great interests because each pixel can be selectively turned on or off by a switching element provided in each pixel. Various modes of AMLCDs such as an in-plane switching (IPS) mode and a fringe field switching (FFS) mode have been developed. An IPS mode or a FFS mode LCD includes a pixel electrode pattern and a common electrode formed above a substrate, and liquid crystal molecules are controlled by a transverse electric field which is substantially parallel to the substrate surface. When a voltage is applied to the pixel electrode pattern, the liquid crystal molecules rotate in a plane which is substantially parallel to the substrate surface to allow light transmittance. One of the major advantages provided by an IPS mode or a FFS mode is a wide viewing angle, and compared to the IPS mode, the FFS mode has improved electrode design such that light transmission is enhanced. However, for currently available IPS or FFS mode LCDs, there are still issues to be resolved such as low light transmission, light leakage and color mixture.

Furthermore, there has been a demand in recent years for developing liquid crystal displays having a high pixel density or pixels per inch (PPI) such that a higher resolution can be achieved. However, challenges still exist for the development of high pixel density liquid crystal displays.

BRIEF SUMMARY

An exemplary embodiment of a liquid crystal display device comprises a substrate having a plurality of pixel regions. One of the pixel regions is defined by a pair of gate lines extending in a first direction and a pair of data lines extending in a second direction. A first insulating layer is disposed on the substrate corresponding to the pixel regions and disposed on the data lines. A first common electrode is continuously disposed on the first insulating layer and overlaps the data lines. A pixel electrode pattern is disposed above the first common electrode. A second insulating layer is interposed between the first common electrode and the pixel electrode pattern. A second common electrode is disposed above one of the data lines and electrically connected to the first common electrode. A projection of the second common electrode on the substrate overlaps a projection of the one of the data lines on the substrate. A counter substrate is opposed to the substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The following description is of the preferred mode of carrying out the invention. This description is made for the purpose of illustrating the general principles of the invention and should not be taken in a limiting sense. The scope of the invention is best determined by reference to the appended claims.

Figure 1A:
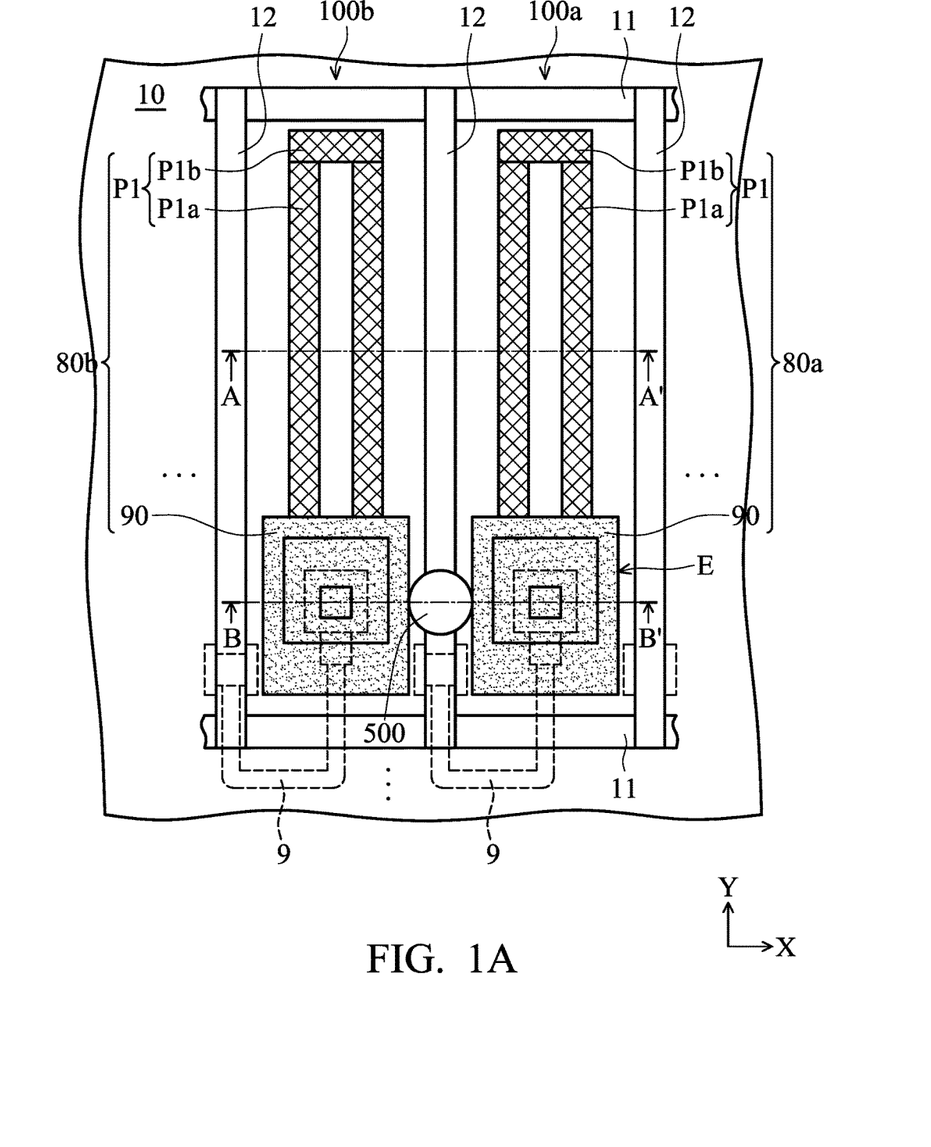
FIG. 1A is a plan view of an embodiment of a portion of a liquid crystal display (LCD) device.
Figure 1B:
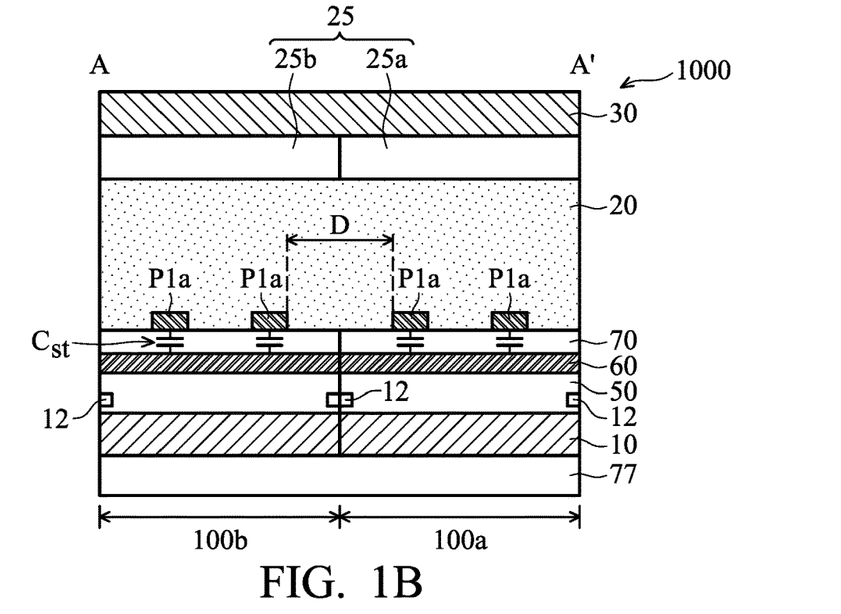
FIG. 1B is a cross-sectional view along A-A' line shown in FIG. 1A.

Refer to FIGS. 1A-1B, in which FIG. 1A illustrates a plan view of an embodiment of a portion of a liquid crystal display (LCD) device 1000 and FIG. 1B illustrates a cross-sectional view along A-A' line shown in FIG. 1A, respectively. In the embodiment, the LCD 1000 may comprise a substrate 10 having at least one pixel region 100a or 100b, a counter substrate 30 opposed to the substrate 10, a liquid crystal layer 20 sandwiched between the two substrates 10 and 30, a color filter layer 25 formed between the liquid crystal layer 20 and the counter substrate 30, and a backlight module 77 disposed under the substrate 10. A light (not shown) emitted from the backlight module 77 may pass through the substrate 10, the liquid crystal layer 20, the color filter layer 25, and the counter substrate 30, in the order descried, to reach a viewer viewing the LCD device 1000. Generally, the backlight module 77 uses a diffusing light. However, light transmittance through the LCD device 1000 is considered low when a diffusing light is used. In some embodiments, the substrate 10 and the counter substrate 30 may each comprise glass, quartz or other suitable light transmissive materials.

The substrate 10 typically includes a plurality of pixel regions which are arranged in an array (i.e. pixel array). Moreover, each pixel region is defined by a pair of gate lines 11 extending in a first direction X and a pair of data lines 12 extending in a second direction Y. For the sake of simplicity, only two pixel regions 100a and 100b are depicted. Each pixel region 100a or 100b may comprise a pixel electrode pattern 80a or 80b formed above the substrate 10. The pixel electrode pattern 80a or 80b may comprise a first portion P1 and a conductive layer 90. In some embodiments, the first potion P1 may be a single columnar structure (not shown). In some embodiments, the first portion P1 may comprise a multiple columnar structure. For example, the first portion P1 may have a pair of first columns P1a spaced apart and extended substantially in the second direction Y. Each of the first columns P1a may respectively be connected to a second column P1b extending substantially in the first direction X. The conductive layer 90 may be part of an electrical connection E formed in the pixel region 100a or 100b. The details of the electrical connection structure E will be further discussed below with reference to FIGS. 3A-3B. Further, each of the pixel regions 100a and 100b may comprise a connecting layer 9 that is electrically connected to the electrical connection E and one of the pair of data lines 12, as shown in FIG. 1A. In some embodiments, the connecting layer 9 may be formed of a semiconductor material such as polysilicon.

Referring to FIG. 1B, the color filter layer 25 may comprise a plurality of color filter regions. Each of the color filter regions may correspond to a respective pixel region. Each color filter region may be red, green, or blue in color, but it is not limited thereto. In some embodiments, adjacent color filter regions may have the same color or have different colors. In FIG. 1B, for example, two color filter regions 25a and 25b are depicted, wherein the color filter region 25a corresponds to the pixel region 100a and the color filter region 25b corresponds to the pixel region 100b.

In each pixel region 100a or 100b, a first insulating layer 50 may be disposed on the substrate 10, and a first common electrode 60 may be disposed on the first insulating layer 50. The pixel electrode pattern 80a or 80b may be disposed above the first common electrode 60 with a second insulating layer 70 interposed between the pixel electrode pattern 80a or 80b and the first common electrode 60. In some embodiments, the first common electrode 60 and the pixel electrode pattern 80a or 80b may each be formed of a transparent conductive material such as indium tin oxide (ITO) or indium zinc oxide (IZO).

A storage capacitance $C_{st}$ may be established between the first common electrode 60 and the pixel electrode pattern 80a or 80b. The magnitude of the storage capacitance $C_{st}$ is determined by at least two factors: the distance between the pixel electrode pattern 80a or 80b and the first common electrode 60; and the area of a vertical projection of the pixel electrode pattern 80a or 80b on the first common electrode 60. Generally, a larger storage capacitance is desired. A larger storage capacitance may help lower flicker level of the LCD device 1000.

Figure 1C:
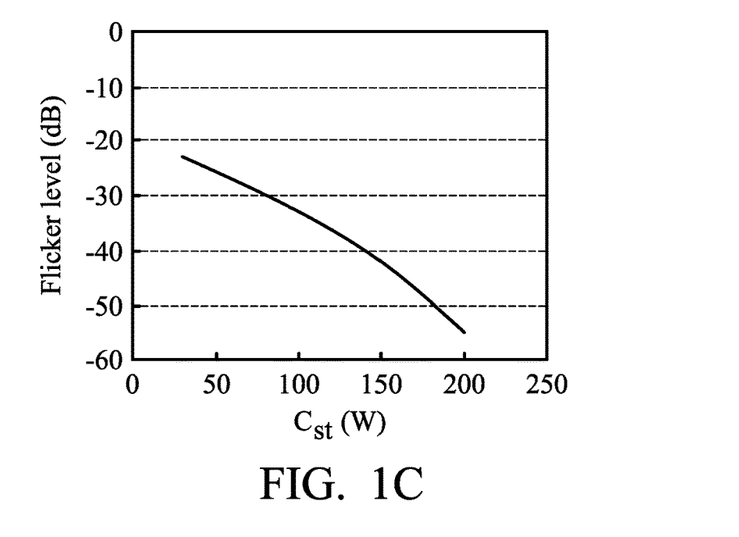
FIG. 1C is a graph of storage capacitance $C_{st}$ versus flicker level of the LCD device in FIG. 1A.

FIG. 1C is a graph of storage capacitance $C_{st}$ versus flicker level of the LCD device 1000. As can be seen from FIG. 1C, as the capacitance $C_{st}$ increases, flicker level of the LCD device 1000 decreases. The storage capacitance $C_{st}$ may be increased by increasing the area (or the number of first columns P1a) of the pixel electrode pattern 80a or 80b above the first common electrode 60. However, there may be an upper limit to the area (or the number of first columns P1a) of the pixel electrode pattern 80a or 80b as will be discussed later. Alternatively or additionally, the storage capacitance $C_{st}$ may be increased by increasing the area of the connecting layer 9. For example, the connecting layer 9 may further comprise an extended portion (not shown) for increasing the area thereof. The connecting layer 9 having an increased area, however, blocks out more light transmitted through the LCD device 1000 from the backlight module 77, thus lowering the light transmittance through the LCD device 1000.

For obtaining high pixel density LCD devices, the pixel regions of the LCD devices are generally required to have a smaller size so that the LCD devices can comprise more pixel regions to achieve a higher pixel density. However, several factors need to be taken into consideration when decreasing the size of the pixel regions, and these factors will be discussed below.

Figure 1D:
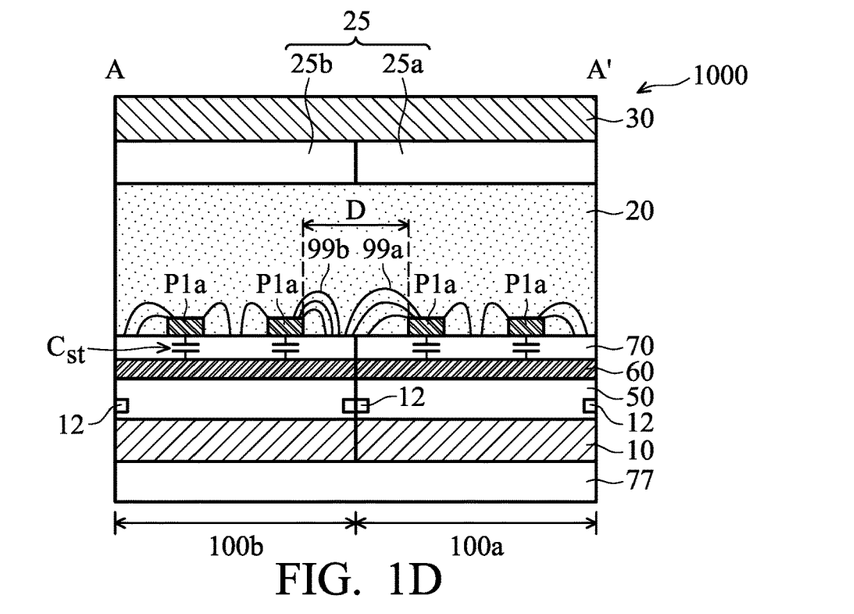
FIG. 1D is a cross-sectional view of two neighboring pixel regions of the LCD device in FIG. 1B, wherein the two neighboring pixel regions are both in the on state.
Figure 1E:
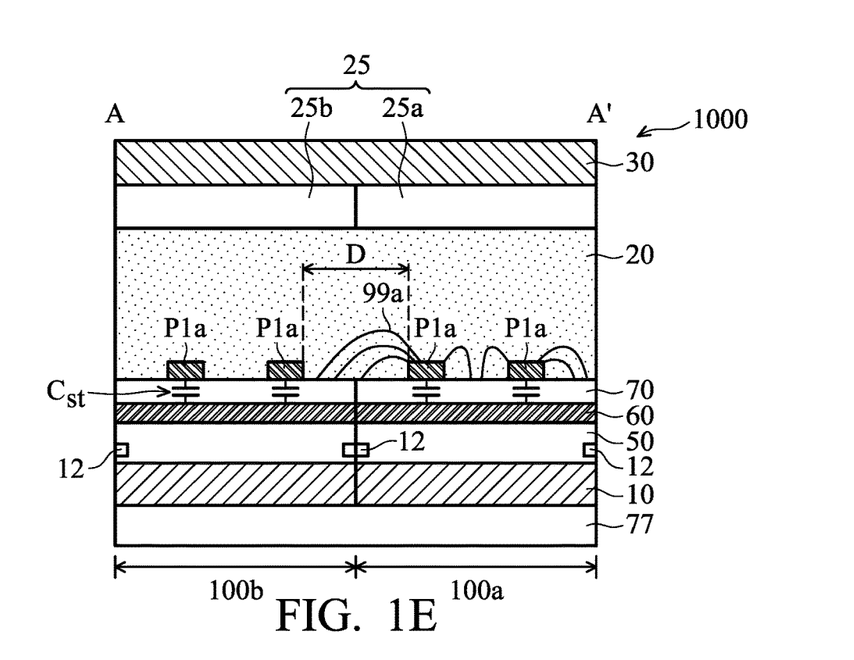
FIG. 1E is a cross-sectional view of two neighboring pixel regions of the LCD device in FIG. 1B, wherein one of the pixel regions is in the on state and the other pixel region is in the off state.

FIG. 1D is a cross-sectional view of two neighboring pixel regions 100a and 100b of the LCD device 1000 in FIG. 1B, wherein the two neighboring pixel regions 100a and 100b are both in the on state. Referring to FIG. 1D, when a voltage is applied to turn on two neighboring pixel regions 100a and 100b, an electric field is generated in each of the pixel regions 100a and 100b. In more detail, in the pixel region 100a, an electric field 99a associated with the pixel electrode pattern 80a is generated in a plane substantially parallel to an upper surface of the substrate 10, and in the pixel region 100b, an electric field 99b associated with the pixel electrode pattern 80b is generated also in the plane substantially parallel to the upper surface of the substrate 10. For the embodiment shown in FIG. 1D, if the nearest distance D between the first columns P1a of the pixel electrode pattern 80a in the pixel region 100a and the first columns P1a of the pixel electrode pattern 80b in the pixel region 100b is too small, then the electric field generated in one pixel region 100a or 100b may not be confined to only the pixel region 100a or 100b but may extend into the other neighboring pixel region 100b or 100a. This is not an issue if both pixel regions 100a and 100b are in the on state. However, in the case where only the pixel region 100a is turned on and the pixel region 100b is in the off state, but the nearest distance D is too small, for example due to the pixel regions 100a and 100b being too small, the electric field 99a generated in the particular pixel region 100a may extend into the neighboring pixel region 100b to cause light leakage from the pixel region 100b, as shown in FIG. 1E. Furthermore, if the pixel region 100a and the pixel region 100b correspond to a color filter region 25a and a color filter region 25b, respectively, wherein the two color filter regions 25a and 25b differ in color, color mixture results.

Two solutions known to the inventor for solving light leakage and color mixture issues are providing sufficiently large nearest distance D as well as further providing light shielding elements in the LCD device 1000. The two solutions may be used separately or in combination depending on practical requirements. In terms of providing sufficiently large nearest distance D between the pixel electrode pattern 80a of pixel region 100a and the pixel electrode pattern 80b of the neighboring pixel region 100b, although light leakage and color mixture are reduced as the nearest distance D increases, other issues may arise as a result. For example, lower pixel densities and/or lower light transmittances through the LCD device 1000. As described previously, if pixel regions 100a and 100b are to be increased in size to obtain a larger nearest distance D, it may be difficult to achieve high pixel densities. In addition, if the area and/or the number of first or second columns P1a or P1b of the pixel electrode pattern 80a or 80b are to be decreased in size to obtain a larger nearest distance D, it may decrease the storage capacitance $C_{st}$.

Figure 2:
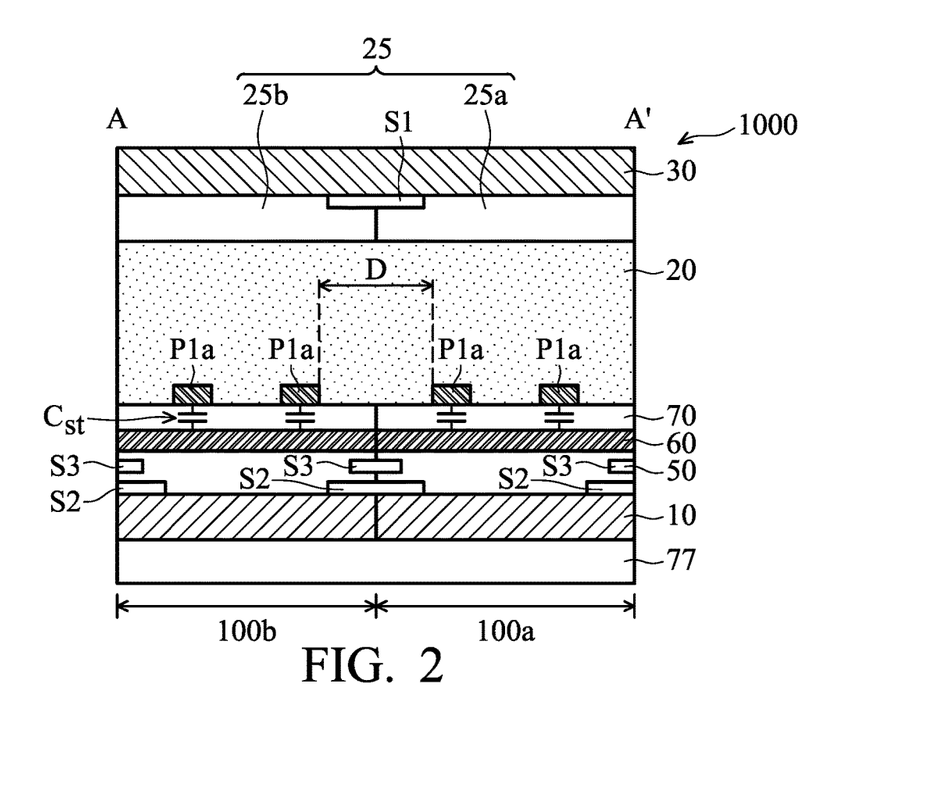
FIG. 2 is a cross-sectional view of another embodiment of the LCD device in FIG. 1B, wherein the LCD device comprises at least one shielding element.

In terms of further providing light shielding elements in the LCD device 1000, the LCD device 1000 may further comprise at least one light shielding element for preventing light leakage. FIG. 2 is an embodiment of the LCD device 1000 with at least one shielding element according to the invention. In the embodiment, three light shielding elements may be formed in the LCD device 1000. For example, a first light shielding element S1 may be formed on the counter substrate 30 and partially embedded in the two neighboring color filter regions 25a and 25b, a second light shielding element S2 may be formed on the substrate 10 and partially embedded in the first insulating layer 50, and a third light shielding element S3 may be formed above the light shielding element S2 and fully embedded in the first insulating layer 50. In another embodiment, only one of the three light shielding elements S1-S3 may be formed. In yet another embodiment, only two of the three light shielding elements S1-S3 may be formed.

Figure 3A:
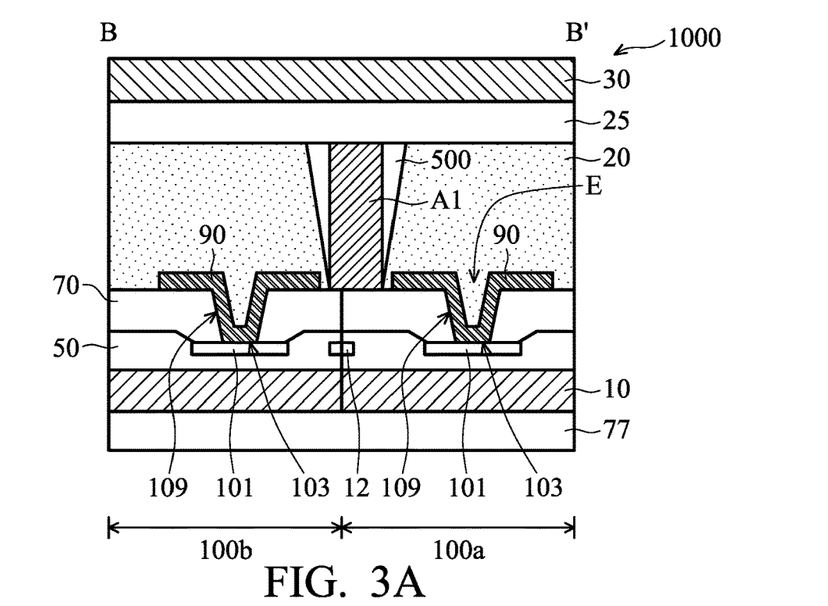
FIGS. 3A and 3B are cross-sectional views of an embodiment along B-B' line shown in FIG. 1A, showing the LCD device without and with spacer misalignment, respectively.
Figure 3B:
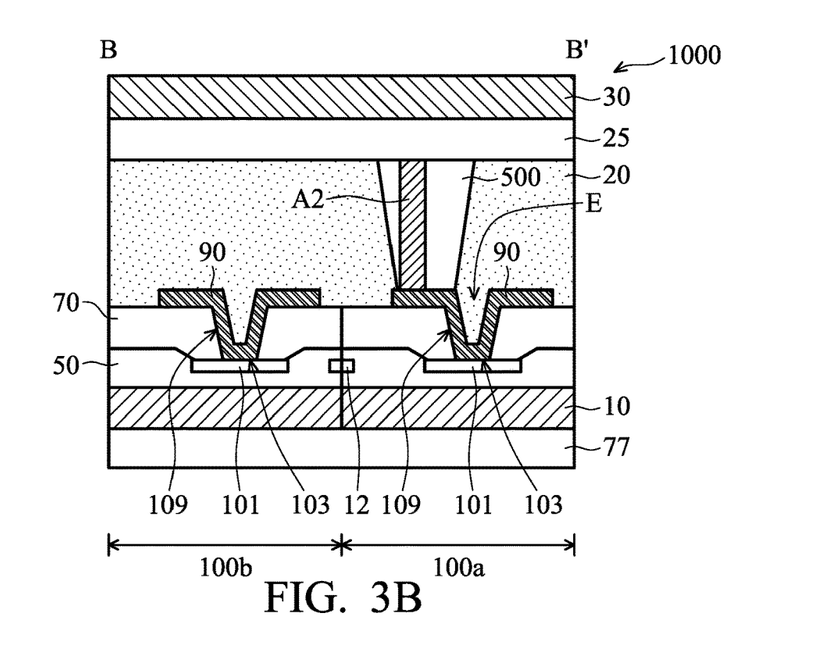
Figure 3C:
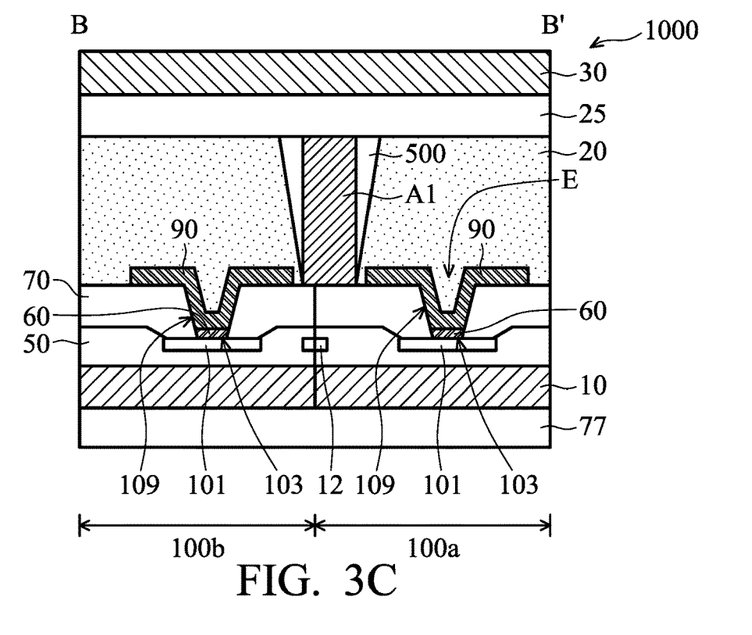
FIGS. 3C and 3D are cross-sectional views of another embodiment along B-B' line shown in FIG. 1A, showing the LCD device without and with spacer misalignment, respectively.
Figure 3D:
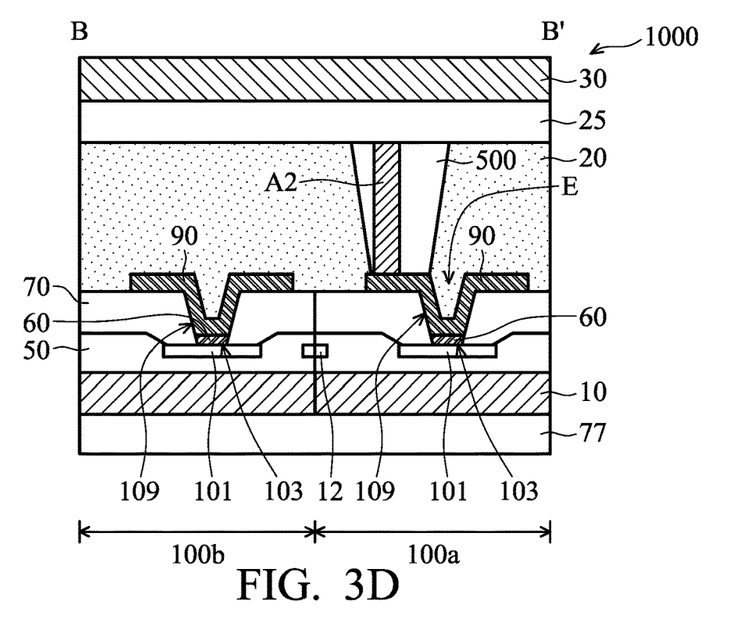

FIGS. 3A and 3B are cross-sectional views of an embodiment along B-B' line shown in FIG. 1A, showing the LCD device 1000 without and with spacer misalignment, respectively. The electrical connection structure E may be electrically connected to one of the pair of data lines 12 through the connecting layer 9 (shown in FIG. 1A). As shown in FIG. 3A, the electrical connection structure E may comprise a metal layer 101 embedded in the first insulating layer 50, wherein a first via opening 103 is formed in the first insulating layer 50 to expose the metal layer 101. The metal layer 101 may extend from one of the pair of data lines 12 or may be electrically connected thereto. A second insulating layer 70 is disposed on the first insulating layer 50, wherein a second via opening 109 is formed in the second insulating layer 70 to expose the metal layer 101. The conductive layer 90 is disposed on the second insulating layer 70 and filled into the first via opening 103 and the second via opening 109, to be electrically connected to the metal layer 101. Accordingly, the metal layer 101 and the conductive layer 90 are electrically connected with each other. In another embodiment, as shown in FIG. 3C-3D, the first common electrode 60 is filled into the first via opening 103, to be electrically connected to the exposed metal layer 101. The second insulating layer 70 is disposed on the first common electrode 60, wherein a second via opening 109 is formed in the second insulating layer 70 to expose the first common electrode 60. A conductive layer 90 is disposed on the second insulating layer 70 and filled into second via opening 109, to be electrically connected to the first common electrode 60. Accordingly, the metal layer 101 and the conductive layer 90 are electrically connected with each other through the first common electrode 60.

At least one spacer 500 may be formed in the liquid crystal layer 20 between the substrate 10 and the counter substrate 30 and correspond to at least one of the pair of data lines 12, as shown in FIG. 3A or 3C. As shown in FIG. 3B or 3D, when there is serious spacer misalignment, the spacer 500 may be formed partially on the second via opening 109. In the case shown in FIG. 3A, the spacer 500 without misalignment is fully supported at the bottom, and the stable area is indicated as the shaded area A1. However, referring to FIG. 3B or 3D, when the spacer 500 with misalignment is formed partially on the second via opening 109, the spacer 500 is only partially supported at the bottom, and the stable area A2 indicated is smaller in comparison to the stable area A1 shown in FIG. 3A or 3C. Since the spacer 500 functions to space keep apart the two opposing substrates 10 and 30 of the LCD device 1000, if the spacer 500 is destabilized due to serious misalignment, the structural integrity of the LCD device 1000 may be adversely affected. Further, as the dimension of the pixel regions of an LCD device of a given size shrinks for developing high pixel density LCD devices, the problem of spacer misalignment may become more prominent. This is due to for example the tolerance in mounting the spacer on the substrate becoming more significant as the dimension of the pixel region shrinks. One solution known to the inventor for avoiding spacer misalignment is to decrease the spacer size.

Another embodiment of the LCD device 2000 will be described below with reference to FIGS. 4A-4D and FIGS. 5A-5B. In the LCD device 2000, elements similar to that in the LCD device 1000 will have the same or similar reference numerals and similar descriptions. For the sake of simplicity, the same descriptions will not be repeated unless it is necessary, and only the differences between the LCD device 1000 and the LCD device 2000 will be discussed herein.

Figure 4A:
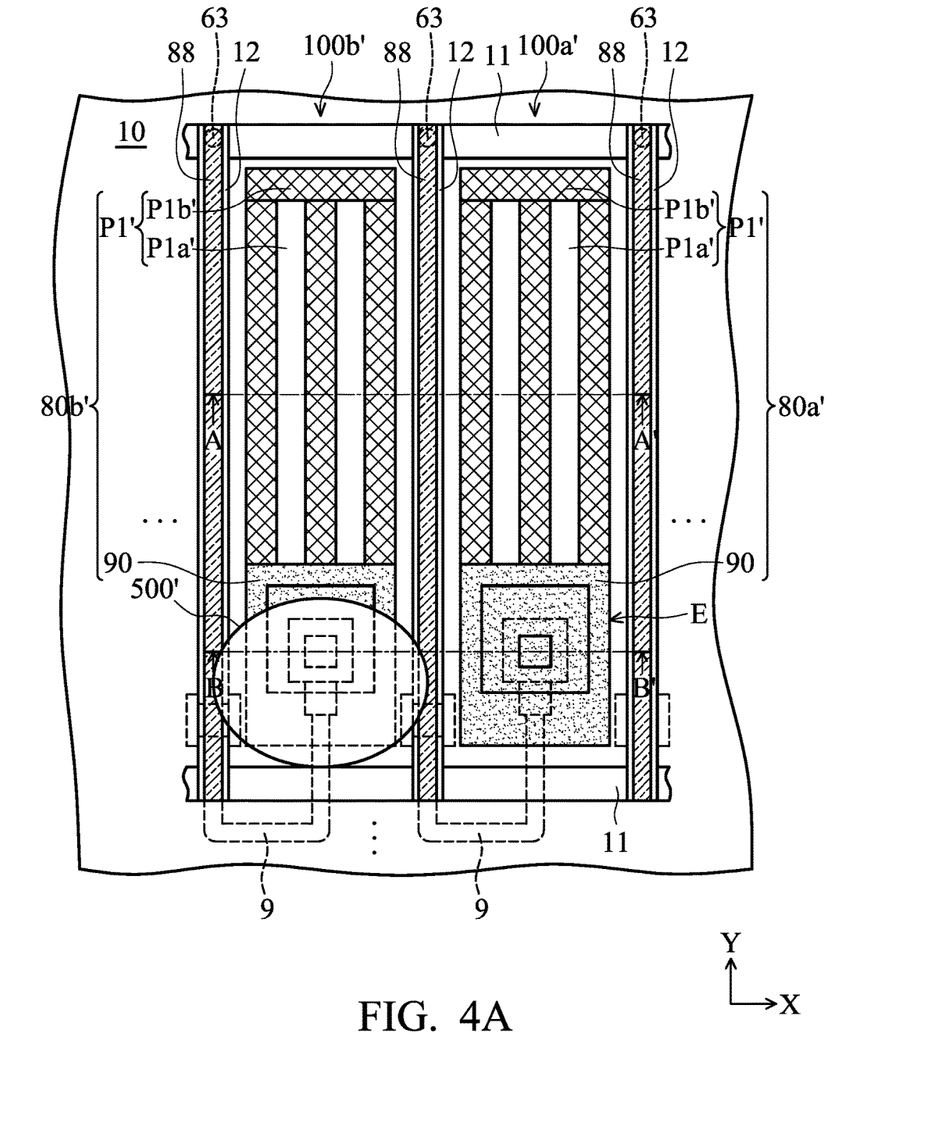
FIG. 4A is a plan view of an embodiment of a portion of an LCD device according to the invention.
Figure 4B:
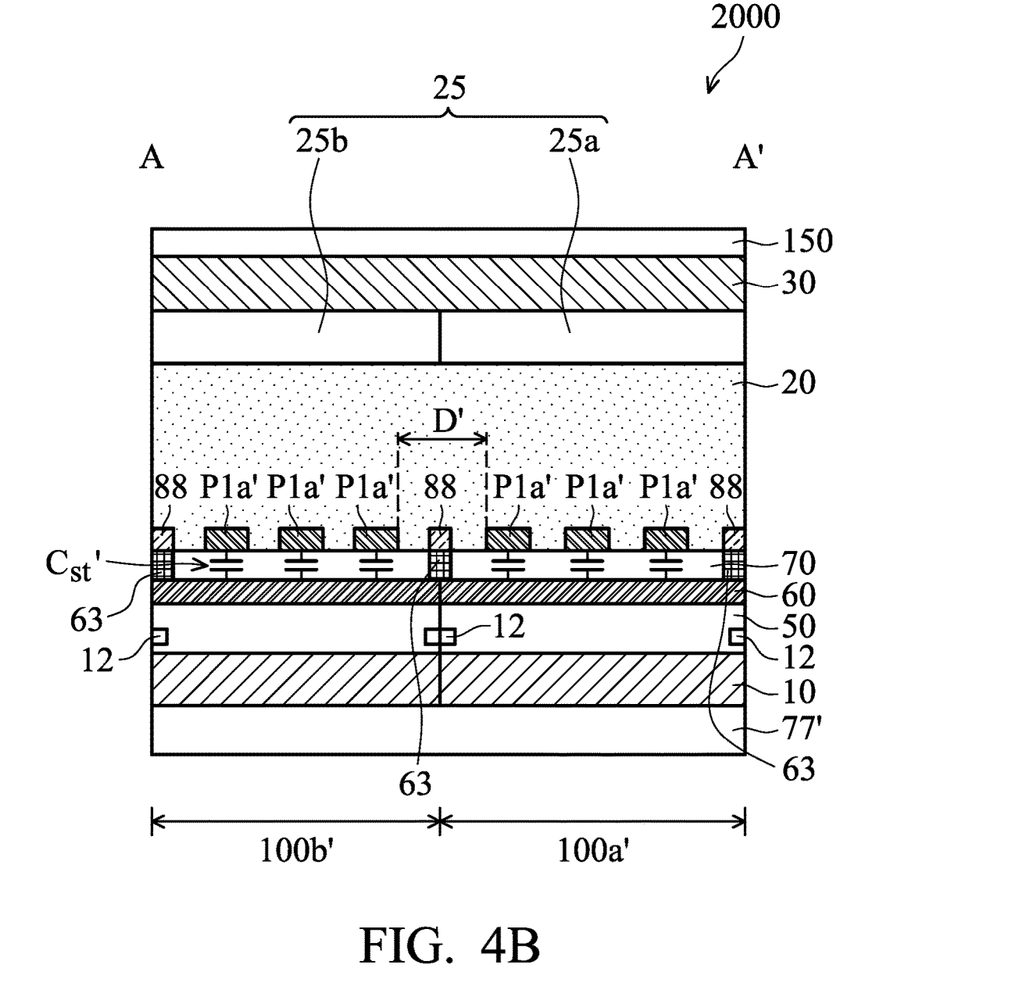
FIG. 4B is a cross-sectional view along A-A' line shown in FIG. 4A.

Refer to FIGS. 4A-4B, in which FIG. 4A illustrates a plan view of an embodiment of a portion of an LCD device 2000 according to the invention and FIG. 4B illustrate a cross-sectional view along A-A' line shown in FIG. 4A, respectively. In the embodiment, the LCD device 2000 may similarly comprise a substrate 10, a counter substrate 30 opposed to the substrate 10, at least one pixel region 100' formed on the substrate 10, a liquid crystal layer 20 sandwiched between the two substrates 10 and 30, a color filter layer 25 formed between the liquid crystal layer 20 and the counter substrate 30, and a backlight module 77' disposed under the substrate 10. A light (not shown) emitted from the backlight module 77' may pass through the substrate 10, the liquid crystal layer 20, the color filter layer 25, and the counter substrate 30, in the order descried, to reach a viewer viewing the LCD device 2000. It is noted that the substrate 10, the counter substrate 30, the liquid crystal layer 20, and the color filter layer 25 of the LCD device 2000 may be similar to that of the LCD device 1000 as shown in FIGS. 1A-1B.

Moreover, the substrate 10 typically comprises a plurality of pixel regions which are arranged in an array (i.e. pixel array). Each pixel region is defined by a pair of gate lines 11 extending in a first direction X and a pair of data lines 12 extending in a second direction Y. For the sake of simplicity, only two pixel regions 100a' and 100b' are depicted. Each pixel region 100a' or 100b' may comprise a pixel electrode pattern 80a' and 80b' formed above the substrate 10. The pixel electrode patterns 80a' and 80b' may comprise a first portion P1' and a conductive layer 90. In some embodiments, the first potion P1' may be a single columnar structure (not shown). In some embodiments, the first portion P1' may comprise a multiple columnar structure. For example, the first portion P1' may have a plurality of first columns P1a' spaced apart and extended substantially in the second direction Y. Each of the first columns P1a' may respectively be connected to a second column P1b' extending substantially in the first direction X. Due to reasons that will be discussed later, the first portion P1' may have an increased area compared with the first portion P1 shown in FIG. 1A. Further, each of the pixel regions 100a' and 100b' may also comprise a connecting layer 9 that is electrically connected to the electrical connection E and one of the pair of data lines 12, as shown in FIG. 4A. In some embodiments, the connecting layer 9 may be formed of a semiconductor layer such as polysilicon.

Further, a pair of second common electrodes 88 may be formed on the second insulating layer 70 and corresponding to the pair of data lines 12. In the embodiment, the pair of second common electrodes 88 may extend substantially in the second direction Y. In some embodiments, the pair of second common electrodes 88 may be formed of a transparent conductive material such as ITO or IZO. In some embodiments, the pair of second common electrodes 88 may be formed of the same material as the first common electrode 60 and/or the pixel electrode patterns 80a' and 80b'. In the embodiment, the pair of second common electrodes 88 may be formed of the same material and by the same process as that of the pixel electrode pattern 80a' and 80b', and thus no additional process is required.

At least one switching device (not shown) such as a thin film transistor (TFT) may be provided in each pixel region 100a' or 100b'. In some embodiments, each pixel region 100a' or 100b' may comprise two TFTs. In other embodiments, each pixel region 100a' or 100b' may comprise three TFTs.

Figure 4C:
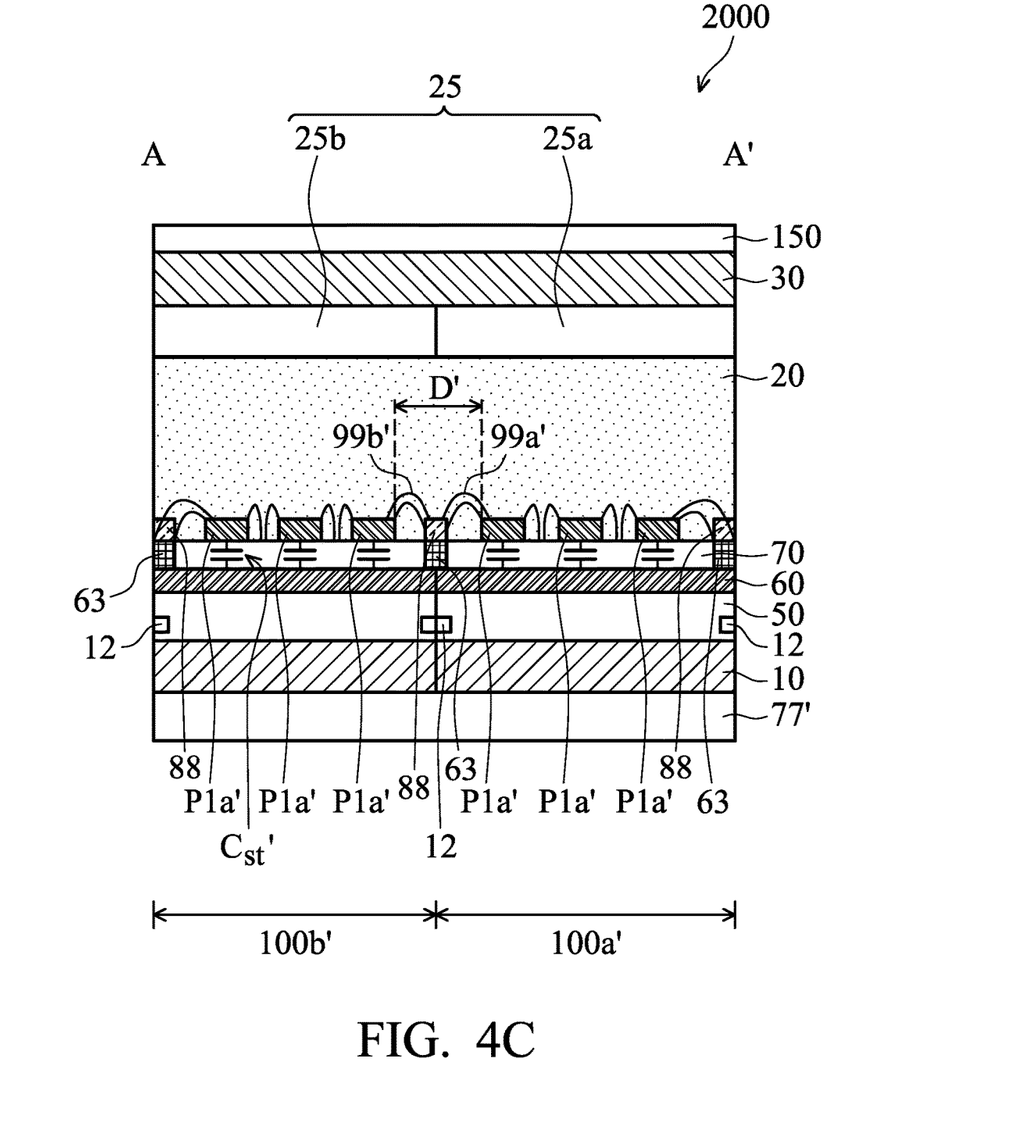
FIG. 4C is a cross-sectional view of two neighboring pixel regions of the LCD device in FIG. 4B, wherein the two neighboring pixel regions are both in the on state.
Figure 4D:
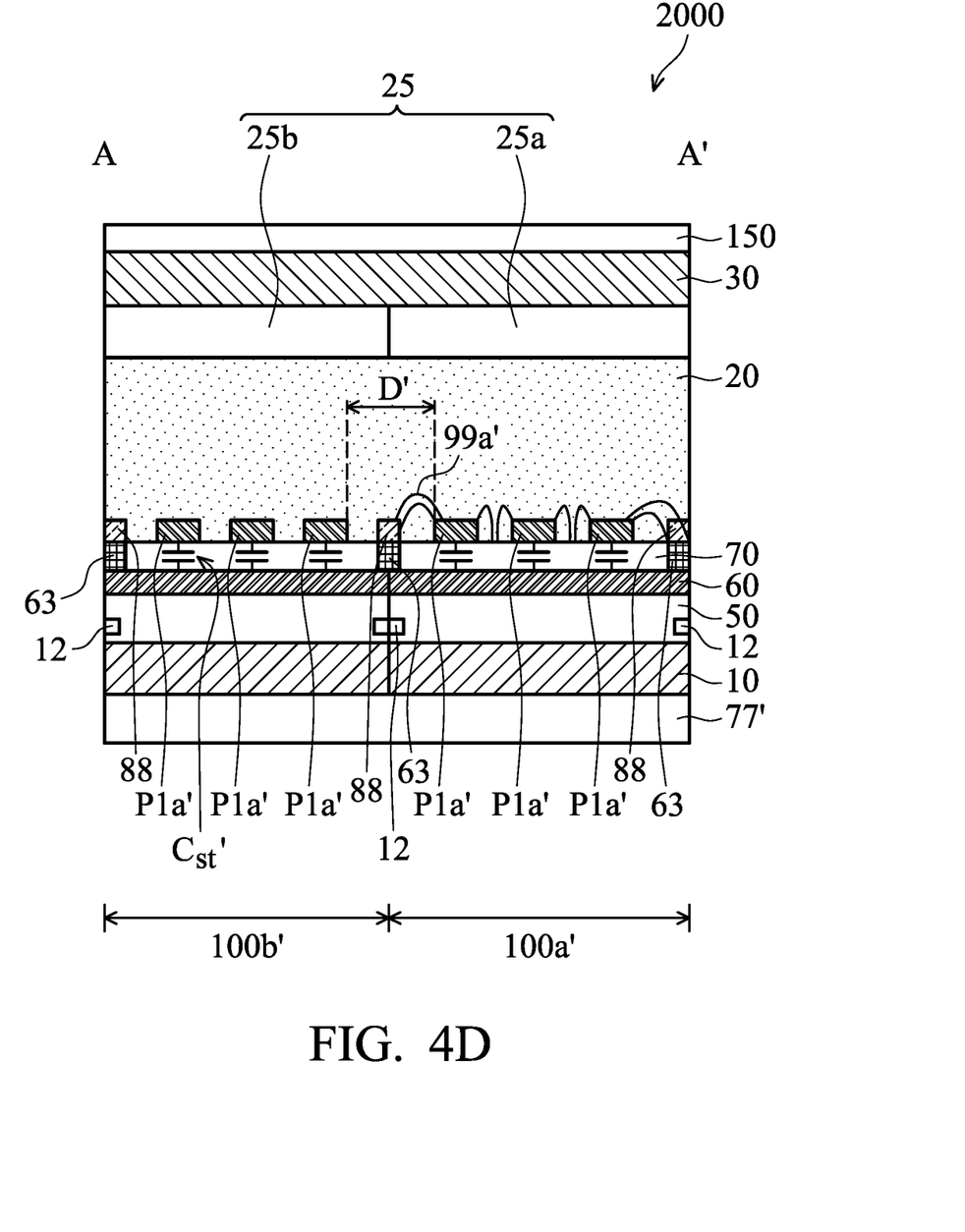
FIG. 4D is a cross-sectional view of two neighboring pixel regions of the LCD device in FIG. 4B, wherein one of the pixel regions is in the on state and the other pixel region is in the off state.

FIG. 4C is a cross-sectional view of two neighboring pixel regions 100a' and 100b' of the LCD device 2000 in FIG. 4B, wherein the two neighboring pixel regions 100a' and 100b' are both in the on state. Similar to that shown in FIG. 1E, an electric field 99a' associated with the pixel electrode pattern 80a' is generated in the pixel region 100a' in a plane substantially parallel to an upper surface of the substrate 10, and an electric field 99b' associated with the pixel electrode pattern 80b' is generated in the pixel region 100b' also in the plane substantially parallel to the substrate surface. Particularly, it is noted that the pair of second common electrodes 88 now formed on the pair of data lines 12 between neighboring pixel regions 100a' and 100b' may help reduce or eliminate light leakage and color mixture by confining the electric field 99a' or 99b' to the corresponding pixel region 100a' or 100b'. FIG. 4D is a cross-sectional view of two neighboring pixel regions of the LCD device in FIG. 4B, wherein one of the pixel regions is in the on state and the other pixel region is in the off state. Referring to 4D, only the pixel region 100a' is in the on state, and the pixel region 100a' is in the off state, the electric field 99a' is confined to the pixel region 100a'. The reasons for electric field confinement to the corresponding pixel region by the pair of second common electrodes 88 may be that the pair of second common electrodes 88 has a shielding function. As a result of the reduction or elimination of electric fields extending into a neighboring pixel region, the nearest distance D' between the first columns P1a' of the pixel electrode pattern 80a' in the pixel region 100a' and the first columns P1b' of the pixel electrode pattern 80b' in the neighboring pixel region 100b' may be reduced. As described previously, the first portion P1' of the LCD device 2000 may have a structure similar to that of the first portion P1 of the LCD device 1000. However, due to the decreased nearest distance D', if the spacing between the first columns remains fixed, then the structure of first portion P1' may have more than two first columns P1a', as shown in FIG. 4A. Thus, the storage capacitance $C_{st}'$ of the LCD device 2000 may be increased.

At least one of the light shielding elements S1-S3 as shown in FIG. 2 may be optionally provided in LCD device 2000 in the same manner, although light leakage and color mixture may readily be largely reduced or eliminated due to the arrangement of the pair of second common electrodes 88. In some embodiments, to further eliminate light leakage and color mixing, a collimated light may be used for the backlight module 77'. In some embodiments, an optional diffusing film 150 may be optionally provided on the counter substrate 30 and opposing the substrate 10.

In the embodiment, the first common electrode 60 may be electrically connected to the pair of second common electrodes 88. For example, the first common electrode 60 may be electrically connected to the pair of second common electrodes 88 through a plurality of vias 63 formed in the insulating layer 70 and between the first common electrode 60 and the pair of second common electrodes 88, as shown in FIG. 4B. In some embodiments, the plurality of vias 63 may be respectively formed on intersections of one of the pair of gate lines 11 and the pair of data lines 12. Moreover, the pixel region 100a' or 100b' including the plurality of vias 63 may be a peripheral pixel region included in a pixel array (not shown) of substrate 10 for convenience of inputting a common voltage (not shown) in parallel, as shown in FIG. 4A.

Figure 5A:
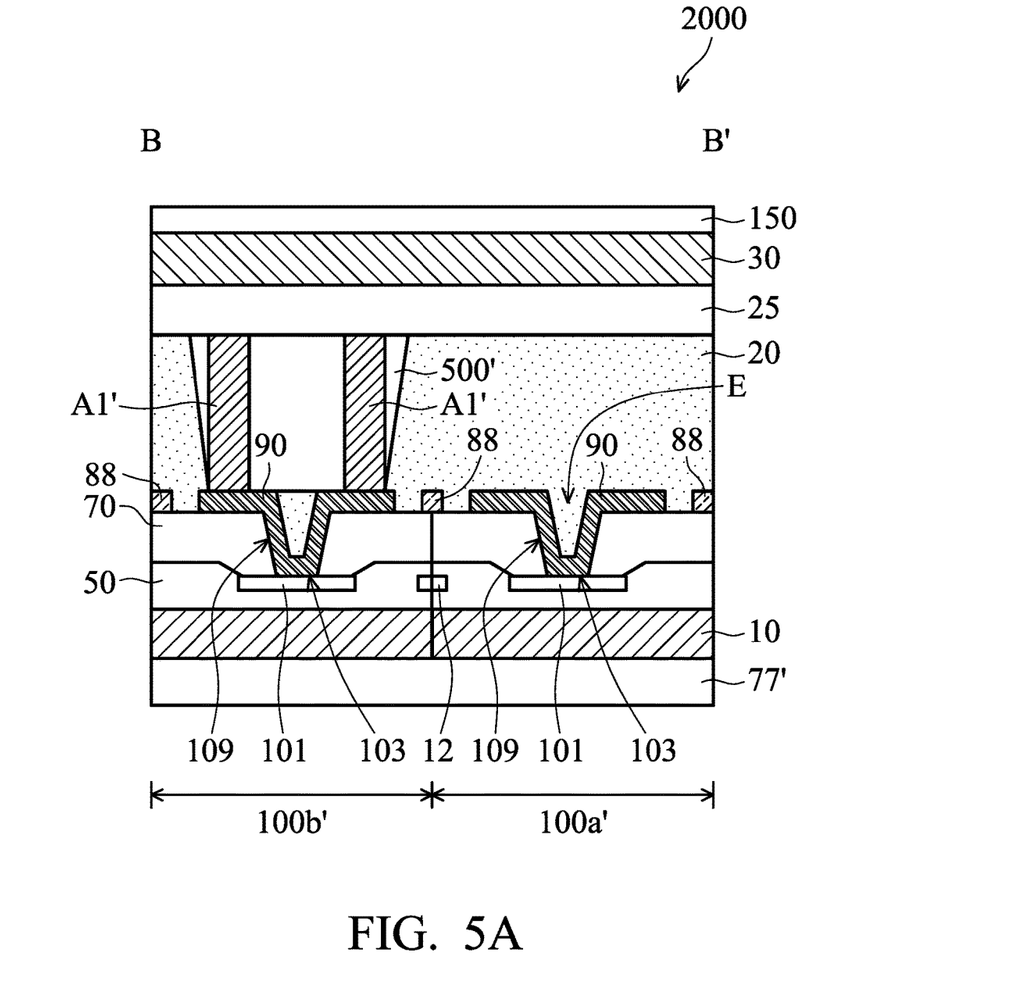
FIGS. 5A-5B are cross-sectional views along B-B' line shown in FIG. 4A, showing the LCD device without and with spacer misalignment, respectively.
Figure 5B:
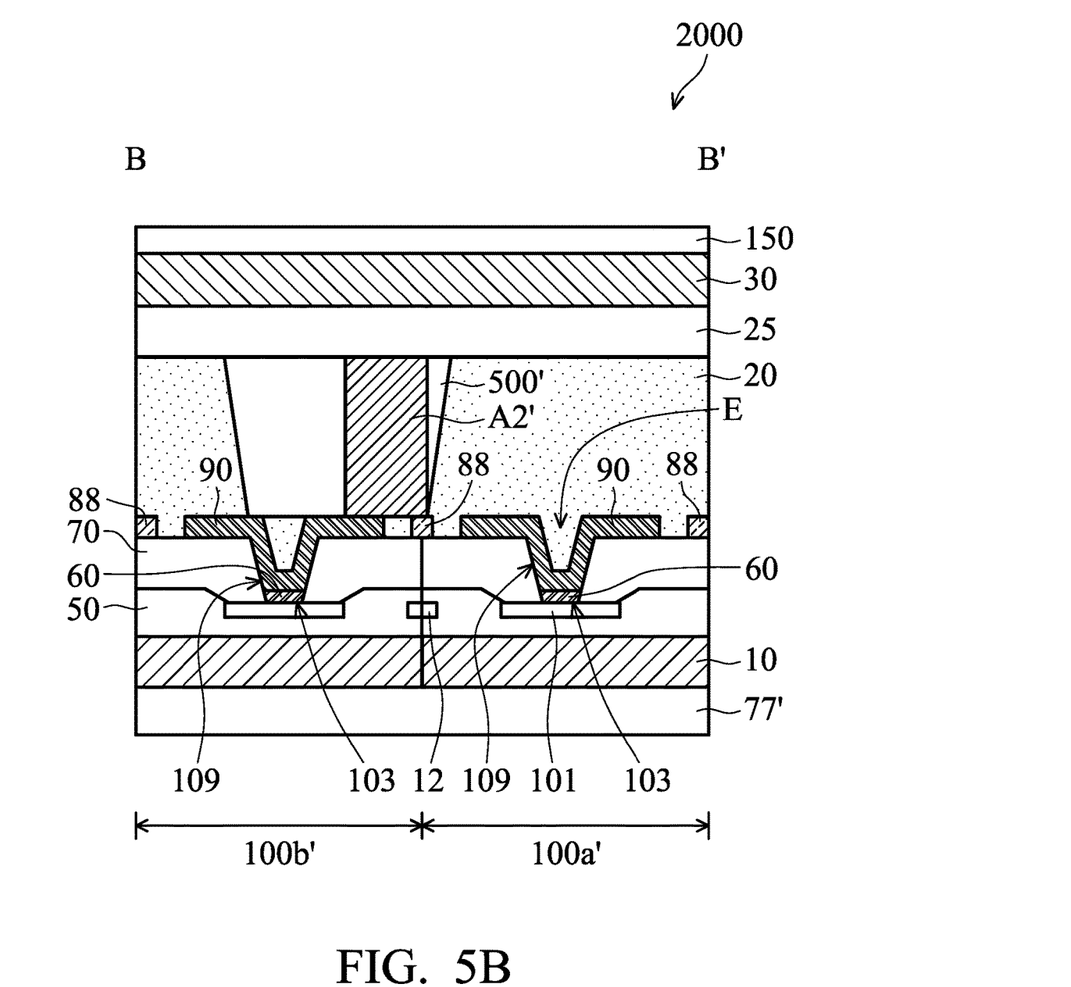

FIGS. 5A-5B are cross-sectional views of an embodiment along B-B' line shown in FIG. 4A, showing the LCD device 2000 without and with spacer misalignment, respectively. It is understood that in another embodiment (not shown), the electrical connection structure E may be similar to that shown in FIGS. 3D-3E. In this embodiment, the first common electrode 60 may be filled into the first via opening 103 to be electrically connected to the exposed metal layer 101, the second insulating layer 70 may be disposed on the first common electrode 60, wherein a second via opening 109 is formed in the second insulating layer 70 to expose the first common electrode 60, and a conductive layer 90 may be disposed on the second insulating layer 70 and filled into second via opening 109 to be electrically connected to the first common electrode 60. Accordingly, the metal layer 101 and the conductive layer 90 may be electrically connected with each other through the first common electrode 60. Referring to FIGS. 5A-5B, at least one spacer 500' may be formed in the liquid crystal layer 20 between the substrate 10 and the counter substrate 30. In the embodiment, the spacer 500' may have a significantly larger size compared with the spacer 500 described previously with reference to FIGS. 3A-3B. In particular, the spacer 500' may have a size (or diameter) significantly larger than that of the second via opening 109 so that the bottom area of spacer 500' that is supported remains relatively unchanged regardless of where the spacer 500' may be formed, as can be seen from FIGS. 5A-5B. Thus, although the spacer 500' may be formed in different areas, the stable areas A1' and A2' of the spacer 500' in each of FIG. 5A and FIG. 5B, respectively, may still be similar. Thus, the adverse effects caused by spacer misalignment may be eliminated by using the improved spacer design according to the embodiments of the invention.

It is understood that the spacer 500' may have any size (or diameter) or shape desired as long as its size (or diameter) is significantly larger than that of the second via opening 109. In one embodiment, the spacer 500' may have an elliptical shape having a major axis substantially in the second direction Y. In another embodiment, the spacer 500' may have an elliptical shape having a major axis substantially in the first direction X. In yet another embodiment, the spacer 500' may be substantially round in shape. Thus, the spacer 500' of the LCD device 2000 has improved stability, which improves the structural integrity of the LCD device 2000. Further, since spacer misalignment may not be a serious concern, it allows a more flexible spacer design.

According to foregoing embodiments, an improved LCD device with a high storage capacitance, reduced or no light leakage and color mixture issues, enhanced spacer stability and LCD device structural integrity, and a more flexible spacer design is provided.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display device, comprising:
a substrate having a plurality of pixel regions, wherein a plurality of gate lines extending in a first direction and a plurality of data lines extending in a second direction intersect to define the plurality of pixel regions;
a first insulating layer disposed on the substrate corresponding to the pixel regions and disposed on the data lines;
a first common electrode disposed on the first insulating layer and overlapping the data lines;
a pixel electrode pattern disposed on the first insulating layer and insulated from the first common electrode;
a second insulating layer disposed between the first common electrode and the pixel electrode pattern;
a second common electrode disposed on one of the data lines and electrically connected to the first common electrode, wherein a projection of the second common electrode on the substrate overlaps a projection of the one of the data lines on the substrate;
a spacer disposed on the substrate and overlapped with the one of the data lines; and
a counter substrate opposed to the substrate.

2. The liquid crystal display device as claimed in claim 1, wherein the second common electrode comprises a connecting surface electrically connected to the first common electrode.

3. The liquid crystal display device as claimed in claim 2, wherein the connecting surface directly contacts to the first common electrode.

4. The liquid crystal display device as claimed in claim 1, wherein the second insulating layer has a via, and the second common electrode electrically connects to the first common electrode through the via.

5. The liquid crystal display device as claimed in claim 4, wherein the via is disposed on the one of the data lines.

6. The liquid crystal display device as claimed in claim 1, wherein the projection of the second common electrode on the substrate is narrower than the projection of the one of the data lines on the substrate.

7. The liquid crystal display device as claimed in claim 1, wherein the pixel electrode pattern comprises a structure having at least two first columns that are spaced apart and extended substantially in the second direction, wherein each of the first columns is respectively connected to a second column that extends substantially in the first direction.

8. The liquid crystal display device as claimed in claim 1, further comprising a color filter layer formed between the counter substrate and the substrate.

9. The liquid crystal display device as claimed in claim 1, further comprising a backlight module disposed under the substrate.

10. The liquid crystal display device as claimed in claim 1, wherein the spacer corresponds to adjacent two of the pixel regions to form two overlapping areas, and wherein the two overlapping areas are different in size.

11. A liquid crystal display device, comprising:
a substrate having a plurality of pixel regions, wherein a plurality of gate lines extending in a first direction and a plurality of data lines extending in a second direction intersect to define the plurality of pixel regions;
a first insulating layer disposed on the substrate corresponding to the pixel regions and disposed on the data lines;
a first common electrode disposed on the first insulating layer and overlapping the data lines;
a pixel electrode pattern disposed on the first insulating layer and insulated from the first common electrode;
a second insulating layer disposed between the first common electrode and the pixel electrode pattern;
a second common electrode disposed on one of the data lines and electrically connected to the first common electrode, wherein a projection of the second common electrode on the substrate overlaps a projection of the one of the data lines on the substrate;
a connecting layer electrically connects to the one of the data lines, wherein the connecting layer has two overlapping regions overlapped with one of the gate lines; and
a counter substrate opposed to the substrate.

12. The liquid crystal display device as claimed in claim 11, wherein the second common electrode comprises a connecting surface electrically connected to the first common electrode.

13. The liquid crystal display device as claimed in claim 12, wherein the connecting surface directly contacts to the first common electrode.

14. The liquid crystal display device as claimed in claim 11, wherein the second insulating layer has a via, and the second common electrode electrically connects to the first common electrode through the via.

15. The liquid crystal display device as claimed in claim 14, wherein the via is disposed on the one of the data lines.

16. The liquid crystal display device as claimed in claim 11, further comprising a spacer disposed between the substrate and the counter substrate.

17. The liquid crystal display device as claimed in claim 16, wherein the spacer corresponds to adjacent two of the pixel regions to form two overlapping areas, and wherein the two overlapping areas are different in size.

18. The liquid crystal display device as claimed in claim 11, wherein the pixel electrode pattern comprises a structure having at least two first columns that are spaced apart and extended substantially in the second direction, wherein each of the first columns is respectively connected to a second column that extends substantially in the first direction.

19. The liquid crystal display device as claimed in claim 11, further comprising a color filter layer formed between the counter substrate and the substrate.

20. The liquid crystal display device as claimed in claim 11, further comprising a backlight module disposed under the substrate.

* * * * *